United States Patent [19]

Cartier et al.

[11] Patent Number: 4,874,814

[45] Date of Patent: Oct. 17, 1989

[54] CROSS-LINKED POLYVINYL BUTYRAL

[75] Inventors: George E. Cartier, Springfield; Peter H. Farmer, Longmeadow, both of Mass.

[73] Assignee: Monsanto Company, St. Louis, Mo.

[21] Appl. No.: 316,564

[22] Filed: Feb. 27, 1989

Related U.S. Application Data

[63] Continuation of Ser. No. 751,116, Jul. 2, 1985, abandoned.

[51] Int. Cl.$^4$ ............................................. C08F 8/00
[52] U.S. Cl. .................................................. 525/61
[58] Field of Search ........................................ 525/61

[56] References Cited

U.S. PATENT DOCUMENTS 2,487,864 11/1949 Gaylor ..................................... 28/82
3,963,618 6/1976 Muir ....................................... 525/61

FOREIGN PATENT DOCUMENTS 0454832 3/1949 Canada ................................... 525/61
38-19318 8/1963 Japan ...................................... 525/61
0019318 8/1963 Japan .
34389 4/1975 Japan ...................................... 525/61
0107390 6/1985 Japan .

Primary Examiner—Joseph L. Schofer
Assistant Examiner—J. M. Reddick
Attorney, Agent, or Firm—Michael J. Murphy; William J. Farrington

[57] ABSTRACT

Polyvinyl butyral (PVB) resin lightly cross-linked through stable intermolecular linkages developed, for example, through use of a dialdehyde or trialdehyde, to selectively increase PVB molecular weight and the modulus of a plasticized sheet formed therefrom intended for use in laminated safety glass assemblies.

7 Claims, No Drawings

4,874,814

CROSS-LINKED POLYVINYL BUTYRAL

This is a continuation of application Ser. No. 751,116, filed July 2, 1985 now abandoned.

BACKGROUND OF THE INVENTION

This invention relates to polyvinyl butyral (PVB) resin and more particularly to (i) selectively cross-linked PVB, (ii) a plasticized sheet formed therefrom and (iii) methods of forming such resin and sheet.

Plasticized PVB sheet is very well known as an intermediate for use with glass or plastic panels (hereinafter called "laminating panels") in laminated safety glass assemblies. It is also well known that the high temperature modulus properties of such a sheet and of the PVB resin from which it is made must be closely controlled for optimum performance. For example, if the resin is too stiff, the power required to melt and extrude it into sheet form may be excessive or the resulting sheet may be difficult to handle and may not provide a quality laminate during preparation of the safety glass assemblies. More specifically, when the sheet is too stiff, visually apparent, undesirable air bubbles can appear in the finished laminate. On the other hand, during lamination at the usual, relatively high (e.g. ca.192° C.) temperatures, it is important that the PVB flow adequately to collapse the sheet and fill the space between the two laminating panels, but not so much as to flow out the edges of the laminate which can occur if the modulus of the sheet is too low. In the past, such a delicate matching of the high temperature properties of the sheet to the laminating conditions has frequently not been possible with the result that the laminating operating conditions had to be inconveniently continuously adapted to the properties of the particular sheet being laminated. To the best of present knowledge, a means to control the high temperature properties of a plasticized PVB sheet has not been available in the past to one of ordinary skill in the art.

SUMMARY OF THE INVENTION

Now improvements have been made in the manufacture of PVB resin and sheet made therefrom which minimize or overcome the aforementioned shortcomings of the prior art.

Accordingly, it is a principal object of this invention to tailor the high temperature modulus of PVB sheet to accommodate various laminating conditions by incrementally selectively increasing the molecular weight of the PVB resin.

Another object is to achieve such PVB molecular weight increase by cross-linking two PVOH chains during or just before the acetalization reaction forming the PVB resin.

Other objects of this invention will in part be obvious and will in part appear from the following description and claims.

These and other objects are accomplished in the broadest sense by providing a PVB resin which is lightly cross-linked through stable intermolecular linkages, as well as a plasticized sheet formed therefrom which contains such linkages. Stable intermolecular linkages are defined herein as those which, once formed in the PVB, are sufficiently stable as to survive the sheet-shaping process, warehouse storage and the laminating process. Such stable linkages are preferably diacetal linkages developed through an aldehyde containing at least two aldehyde groups.

In more specific form, a method is provided of forming extruded PVB sheet which comprises acetalizing polyvinyl alcohol (PVOH) with butyraldehyde in the presence of a cross-linking agent to produce polyvinyl butyral resin lightly cross-linked through stable intermolecular linkages, mixing such resin with plasticizer and other optional additives to form an extrusion formulation and extruding such formulation in melt form through an extrusion opening to form a sheet without rupturing such stable crosslinkages.

Also provided is a process for increasing the viscosity of polyvinyl butyral which comprises having a cross-linking agent present before or during acetalization of polyvinyl alcohol with butyraldehyde to lightly cross-link the acetalized product through adjacent polyvinyl alcohol chains.

The preferred cross-linking dialdehydes are glutaraldehyde, 4,4(ethylenedioxy) dibenzaldehyde and 2-hydroxyhexanedial. The extent of cross-linking is adequate to increase the viscosity of the polyvinyl butyral by about 2% to about 85% over its viscosity in the absence of such stable cross-linkages.

DETAILED DESCRIPTION OF PREFERRED EMBODIMENTS

The PVB lightly cross-linked through diacetal intermolecular linkages has the following formula for a section of polymer chain when employing glutaraldehyde as the cross-linking agent:

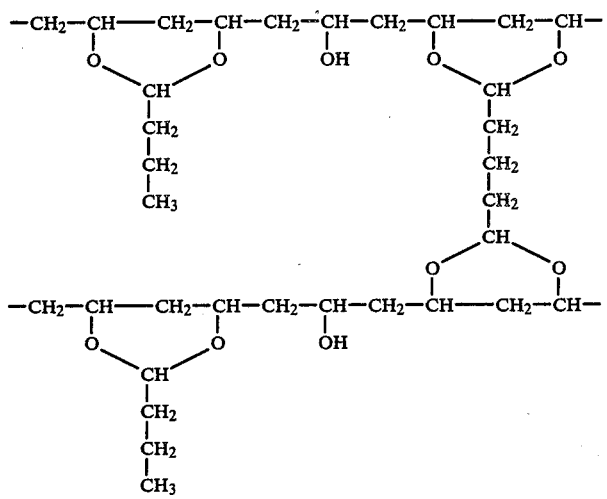

As depicted above, the PVB portion of the structure, present at a level of 65–95 weight % of vinyl butyral units in the polymer, is formed through reaction of butyraldehyde with two adjacent hydroxyl groups on the same PVOH chain. The intermolecular cross-linkages (in this case diacetal cross-links) are formed through reaction of one active group of the cross-linking agent (in this case aldehyde) with a pair of adjacent OH groups on one PVOH chain and another active group (in this case also aldehyde) with such a pair of OH's on an adjacent, neighboring chain. By such cross-linking, the PVB molecular weight is conveniently increased in that one cross-link tying together two chains provides the same molecular weight as if two equivalent PVB chains were linked together end to end. The latter is thought to require a difficult synthesis of special, high molecular weight PVOH's and polyvinyl acetate precursors. Yet because such cross-linking is light (to be later defined) and does not join all PVB chains in this manner, some chains being uncross-linked and in the form of conventional PVB polymer units, the molecular weight distribution of the PVB is desirably increased.

In the present invention, as far as the chemical reaction of a cross-linking agent with polyvinyl alcohol to produce intermolecular linkages is concerned, there are no limitations on the choice of the cross-linking agent as long as it contains active groups capable of interacting with a pair of hydroxyl groups on each of two neighboring PVOH molecular chains to form stable intermolecular linkages which are retained through the melting and extruding operation employed in forming plasticized PVB sheet and the subsequent storage and laminating of such sheet to form safety glass assemblies. Intra-acetal linkages occuring through hydroxyl groups on the same PVB chain are representative of unstable linkages considered to rupture during sheet-shaping or laminating and, if exclusively the means through which cross-linking occurs, are not considered part of the present invention. With the foregoing in mind, the chemical structure of the crosslinking agent is not of consequence in the intended function of sheet formation from the modified PVB resin. Operable cross-linking agents include diepoxides such as diglycidyl ether bisphenol A; titanates such as tetraisopropyl titanate; polyepoxides; aldehydes containing at least two CHO groups such as dialdehydes, trialdehydes and the like.

The preferred cross-linking agents are dialdehydes, for example, oxaldehyde and the more complex dialdehydes, and trialdehydes containing aliphatic (with or without unsaturation), aromatic or mixed aliphatic-/aromatic groups between carbonyl linkages of the CHO groups. Specific functional dialdehydes include aliphatic dialdehydes such as propanedial, succinaldehyde, adipaldehyde, 2-hydroxyhexanedial, etc.; aromatic dialdehydes include phthalaldehyde, 1,4,benzenediacetaldehyde, 4,4(ethylenedioxy) dibenzaldehyde, 2,6-napthalene dicarbaldehyde, etc. Operable trialdehydes include N,N', N''-(3,3,'3''-trisformylethyl) isocyanurate and the like. Mixtures of the foregoing and other cross-linking agents are also suitable. Preferred dialdehydes are selected from the group consisting of glutaraldehyde, 4,4'(ethylenedioxy) dibenzaldehyde and 2-hydroxyhexanedial. The most preferred dialdehyde is glutaraldehyde.

The level of cross-linking should not be so low as to provide no effect on the resulting sheet properties in comparison with sheet made from uncross-linked PVB but, on the other hand, it should not be so high as to adversely affect sheet properties. For example, at too high a cross-link level the sheet will be too stiff and most likely will perform poorly during handling and laminating. The concentration of cross-linking agent should be adequate to lightly cross-link the PVB resin, by which is meant that the viscosity of such cross-linked resin is about 2% to about 85% greater than such viscosity in the absence of the cross-linkages. As will be apparent, the high temperature properties of a plasticized sheet formed from such a lightly cross-linked PVB resin can be conveniently selectively controlled by the extent of cross-linking or, in other words, by the amount of cross-linking agent available to develop such cross-links. To achieve the viscosity percentage increases stated, the viscosity of the lightly cross-linked PVB resin (7.5 weight % solution in methanol at 20° C.) will be between about 90 cps (0.09 Pa.s to about 325 cps (0.325 Pa.s and preferably between about 150–260 cps (0.150–0.260 Pa.s. The concentration of cross-linking agent to provide these cross-linked PVB viscosities will broadly vary with the molecular weight of the cross-linking agent used, the higher the molecular weight of cross-linking agent, the greater the amount required. For the preferred di and trialdehydes, the concentration should be between about 0.0005 to about 0.20 and preferably 0.01 to 0.04 parts per hundred parts of PVOH.

PVOH's useful in this invention are products of the acid or base catalyzed hydrolysis of a polyvinyl ester (usually polyvinyl acetate) which are suitable for the production of PVB resin by condensation with butyraldehyde. Such PVOH's comprise products of a substantially complete as well as incomplete hydrolysis, the latter including those where hydrolysis is purposely stopped short of completion. PVB resin made from such products of incomplete hydrolysis differ in the residual content of polyvinyl ester. Useful PVOH's can contain residues of unhydrolyzed vinyl ester in their molecules in amounts up to 5% by weight (calculated as polyvinyl acetate) although amounts on the order of about 0 to 2.5% by weight of polyvinyl acetate are preferred when the PVB resin is to be used in making interlayer sheeting for safety glass.

Lightly cross-linked PVB resin is produced according to this invention by known aqueous or solvent acetalization processes wherein the PVOH hydrolysis product is reacted with butyraldehyde in the presence of an acid catalyst to produce PVB, followed by neutralization of the catalyst, separation, stabilization and drying of the PVB resin. The cross-linking reaction occurs substantially in conjunction with formation of the PVB resin in this reaction. Depending on its rate of reaction, the cross-linking agent is added to the catalyzed condensation reaction mixture before or simultaneously with the butyraldehyde. In a solvent system, the sequence of addition may be somewhat different; for example, it may be necessary to add the cross-linking agent after the PVB is in solution.

In a solvent process, acetalization is carried out in the presence of sufficient solvent to dissolve the PVB formed and produce a homogeneous solution at the end of acetalization. The PVB is separated from solution by precipitation of solid particles with water which are then washed and dried. Solvents used are lower aliphatic alcohols such as ethanol.

In an aqueous process, acetalization is carried out by adding butyraldehyde to a water solution of PVOH at a temperature on the order of about 20° C., in the presence of an acid catalyst, agitating the mixture to cause an intermediate PVB to precipitate in finely divided form and continuing the agitation while heating until the reaction mixture has proceeded to the desired end point.

The lightly cross-linked PVB resins of the invention have Staudinger molecular weights ranging from about 30,000 to 600,000 and preferably from 45,000 to 270,000 and may be considered to be made up on a weight basis, of from 5 to 30% hydroxyl groups, calculated as polyvinyl alcohol, 0 to 5% ester groups, calculated as polyvinyl ester, and the balance substantially butyral groups. The PVB resin preferably contains, on a weight basis, from 11 to 25% hydroxyl groups, calculated as polyvinyl alcohol, and from 0 to 2.5% acetate groups, calculated as polyvinyl acetate, the balance being substantially butyral groups. The extent of PVB cross-linking in the present invention is so light that the effect on the hydroxyl content of the PVB presently cannot be measured.

In forming the extruded interlayer sheet, the lightly cross-linked PVB resin must be plasticized with from about 20 to 80 parts plasticizer per hundred parts of resin and more commonly between 25 and 45 parts for conventional laminated safety glass use. This latter concentration is generally used with polyvinyl butyrals containing 17 to 25% vinyl alcohol by weight. In general, plasticizers commonly employed are esters of a polybasic acid or a polyhydric alcohol. Particularly suitable plasticizers are triethylene glycol di-(2-ethyl butyrate), dihexyl adipate, dioctyl adipate, mixtures of heptyl and nonyl adipates, dibutyl sebacate, polymeric plasticizers such as the oil-modified sebacid alkyds, and mixtures of phosphates and adipates such as are disclosed in U.S. Pat. No. 3,841,890 and adipates and alkyl benzyl phthalates such as disclosed in U.S. Pat. No. 4,144,217. Other suitable plasticizers are well known or will be obvious to those skilled in the art.

The extruded interlayer formed from plasticized, lightly cross-linked PVB resin according to this invention can be prepared by extrusion through a sheeting die, i.e. forcing molten plasticized PVB through a horizontally long, vertically narrow die opening substantially conforming in length and width to that of the sheet being formed therein or by casting molten polymer issuing from an extrusion die onto a specially prepared surface of a die roll positioned in close proximity to the exit of such die which imparts the desired surface characteristics to one side of the molten polymer. Thus, when the surface of such roll has minute peaks and valleys, sheet formed of polymer cast thereon will have a rough surface on the side which contacts the roll which generally conforms respectively to the valleys and peaks of the roll surface. Further details of construction of such a die roll are disclosed in U.S. Pat. No. 4,035,549, col. 3, line 46 through col. 4, line 44, the content of which is incorporated herein by reference.

A rough surface on the other side of the extruded interlayer formed in a die roll extrusion system can be provided by the design of the die opening through which the extrudate passes. Such a die opening configuration is generally shown in FIG. 4 of U.S. Pat. No. 4,281,980, the content of such figure being incorporated herein by reference. When the outermost end portion of die lip 5 in such figure in the direction of extrusion is parallel with a tangent to the surface of the opposing rotating die roll, and the remaining rearward portion of such lip is at an angle of between about 2 to 7 degrees with such tangent, a rough surface will automatically be generated on the side of the extruded interlayer which is opposite to that formed by the die roll surface.

In addition to plasticizers, interlayers according to this invention may contain other additives such as dyes, ultraviolet light stabilizers, antioxidants, salts to control adhesion and may, if desired, be treated with additives to improve laminating efficiency.

The following procedures were used in obtaining the values for the various properties presented herein:

Melt or complex viscosity of the plasticized, lightly cross-linked PVB with a Rheometric Mechanical Spectrometer at a frequency of 1 hertz. The sample was placed between two parallel plates oscillating at such frequency.

Viscosity by a capillary tube viscometer -Cannon Fenske #400.

The invention is further described with reference to the following examples which are for illustration only and are not intended to imply any limitation or restriction on the invention. Unless otherwise indicated, all quantities are expressed by weight.

EXAMPLES 1-3

Polyvinyl alcohol (PVOH) resin having a residual polyvinyl acetate content of less than 2% was dissolved with agitation in water at 90°-95° C. to form an 8% solution; 1250 g of this PVOH solution (100 g of PVOH) was charged to an agitated fluted reactor and its temperature adjusted to 18° C. To this solution was added 70.86 g of butyraldehyde and various amounts (See Table 1 following) of a 50% aqueous solution of glutaraldehyde which decreased the temperature to about 16° C. 5.7 ml of a 35% water solution of nitric acid was then charged and the mixture held for 22-24 minutes at between 16° and 20° C. and then heated over 20-30 minutes to 75° C. and held thereat for 2.5 h. The contents of the reactor was washed with water at 75° C. to a pH of 4.0. Potassium hydroxide water solution was then charged to provide a pH of 9.5-10.5 and the contents held at this pH for 1.5 h at 75° C. Additional water at 75° C. was then added to decrease the pH to 7.5. The PVB slurry was centrifuged and dried to less than 2% moisture. The viscosity of the dried PVB resin was measured and the following results were obtained:

TABLE 1

| Ex. | Glutaraldehyde charged (g) | PVB viscosity (cps)(Pa.s) |
|---|---|---|
| 1 | 0 | (175)(0.175) |
| 2 | 0.06 | (215)(0.215) |
| 3 | 0.12 | (310)(0.310) |

The foregoing results in Table 1 illustrate the preparation of PVB lightly cross-linked through diacetal intermolecular linkages achieved through the presence of glutaraldehyde at 0.06 and 0.12 parts per hundred parts of PVOH as the cross-linking agent in the acetalization of PVOH with butyraldehyde. That cross-linking occurred is shown by the 23% and 77% increases in the viscosity of the PVB occurring when the minor amount of glutaraldehyde was used in Examples 2 and 3 in comparison with that of control Example 1.

EXAMPLES 4 and 5

These examples illustrate preparation of a plasticized sheet made from the lightly cross-linked PVB of Example 2.

32 parts of dihexyl adipate plasticizer were mixed with 100 parts of the cross-linked PVB resin of Example 2 in a high intensity mixer. The plasticized PVB resin was then melted in an extruder and forced in melt form through a die opening onto the surface of an adjacent rotating die roll of the type previously described which had internal cooling means which regulated the temperature of a die blade in contact with the polymer melt at 104° C. The melt was at 190° C. and the pressure of the die was 350-400 psi (2415-2756 kPa). The extruded sheet had a thickness of about 30 mils (0.76mm) and issued from the die roll at about 457cm per minute. The die lip of the die opening as previously described was formed with a compression angle of about 4 degrees. Each side of the extruded sheet was formed with a rough surface. The melt viscosity of the plasticized cross-linked PVB resin (Example 5) was measured and compared with a control (Example 4) and the following results were obtained:

TABLE 2

| Example | PVB | Melt viscosity (Pa.s) @ 120° C. |
|---|---|---|
| 4 | control | (0.232)(10⁵) |
| 5 | cross-linked | (0.706)(10⁵) |

The foregoing results in Table 2 illustrate preparation of plasticized PVB sheet lightly cross-linked through diacetal intermolecular linkages achieved through the presence of glutaraldehyde as the cross-linking agent in forming the PVB from which the sheet was formed. That the cross-links survived the extrusion operation in forming the sheet from the melt is shown by the increased melt viscosity levels obtained with the cross-linked PVB (Example 5) in comparison with the uncross-linked control (Example 4).

EXAMPLE 6

This Example illustrates preparation of a lightly cross-linked PVB using a dialdehyde containing a mixture of aliphatic and aromatic groups between the carbonyl end groups of the dialdehyde.

The PVOH solution used in Example 1 was charged to the reactor of Example 1 and 3.8 ml. of nitric acid (35% aqueous) and 0.17 g of 4,4'(ethylenedioxy) dibenzaldehyde, i.e.

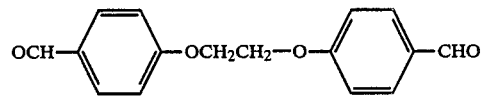

added thereto. This dialdehyde was obtained commercially from Aldrich Chemical Company of Milwaukee, Wis. The reaction mixture was heated to 90° C. over 40 min. and held at 90° C. for 40 min. The solution was then cooled to 20° C. and 67.8 g of butyraldehyde was quickly added with agitation. The reaction mixture was held at this temperature for 40 min. and then heated to 75° C. over a period of 20 min. The remaining conditions and treatment of the resulting product were identical to those described in Examples 1-3. The viscosity of the lightly cross-linked PVB resin obtained was 220 cps (0.220 Pa.s which is about 26% greater than that of the uncross-linked control of Example 1. The sequential cross-linking of the PVOH followed by acetalization with butyraldehyde was necessary because of the reduced reactivity of the larger, bulkier dialdehyde of this Example. It is believed that a plasticized PVB sheet could be formed from this cross-linked PVB by following the procedure of Example 5.

EXAMPLE 7

This Example illustrates preparation of a lightly cross-linked PVB using a long chain aliphatic dialdehyde containing a substituted hydroxyl between carbonyl end groups of the dialdehyde.

The procedure of Example 6 was repeated except that 0.33 g of a 25% aqueous solution of 2-hydroxyhexanedial from Aldrich Chemical Co. i.e.

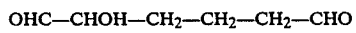

was added to the PVOH-nitric acid mixture instead of the dialdehyde used in Example 6. The reaction mixture was held at 90° C. for 30 min. before cooling to 20° C.

Butyraldehyde (67.8 g) was then added as in Example 6 and the reaction mixture held at 20° C. for 52 min before heating to 75° C. The remaining reaction conditions and treatment of the resulting product were identical to those described in Example 6. The viscosity of the cross-linked PVB resin obtained was 318 cps (0.318 Pa.s which is about 82% greater than that of the uncross-linked control of Example 1. It is believed that a plasticized PVB sheet could be formed from this cross-linked PVB by following the procedure of Example 5.

EXAMPLE 8

This Example illustrates preparation of a cross-linked PVB using a trialdehyde as the agent cross-linking the intermolecular PVOH chains.

The procedure of Example 6 was repeated except that 0.36 g of a 50% aqueous solution of N,N',N''-(3,3',3''trisformylethyl) isocyanate prepared according to U.S. Patent No. 4,293,693, i.e.

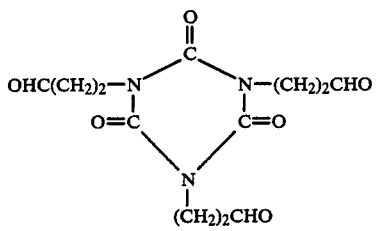

was added to the PVOH-nitric acid mixture instead of the dialdehyde used in Example 7. The remaining procedure, temperatures and amounts of constituents were identical to Example 6. The viscosity of the PVB resin obtained was 300.5 cps (0.3005 Pa.s which is about 72% greater than that of the uncross-linked control of Example 1. It is believed that a plasticized PVB sheet could be formed from this lightly cross-linked PVB by following the procedure of Example 5.

EXAMPLE 9

The procedure of Example 1 was repeated except that i) the PVOH was initially dissolved in water at 105° C. and to the solution was added 62.1 g of butyraldehyde and 0.018 g of a 50% aqueous solution of glutaraldehyde, ii) after addition of the nitric acid catalyst the mixture was heated to 85° C. and held at this temperature for 4 h and iii) after addition of potassium hydroxide, the PVB slurrey was held at 85° C. for 1.5 h. The viscosity of the dried PVB resin obtained was 288 cps or 0.288 Pa.s.

EXAMPLE 10

This Example illustrates preparation of a lightly cross-linked PVB using a diepoxide.

The procedure of Example 6 was repeated except that 0.4g of diglycidyl ether bisphenol A, available from Miller Stephenson Co., Danbury, Conn., was used instead of the dialdehyde of Example 6. The viscosity of the lightly cross-linked PVB resin obtained was 264 cps (0.264 Pa.s which is about 52% greater than that of the uncross-linked control of Example 1. It is believed that a plasticized PVB sheet could be formed from this cross-linked PVB by following the procedure of Example 5.

EXAMPLE 11

This Example illustrates preparation of a lightly cross-linked PVB using a titanate.

The procedure of Example 6 was repeated except that 1.7g of tetraisopropyl titanate, available from Kenrich Petrochemical Co., Inc. of Bayonne, N.J. as KR-38S, was used instead of the dialdehyde of Example 6. The viscosity of the lightly cross-linked PVB obtained was 208 cps (0.208 Pa.s which is about 19% greater than that of the uncross-linked control of Example 1. It is believed that a plasticized PVB sheet could be formed from this cross-linked PVB by following the procedure of Example 5.

EXAMPLE 12

This Example illustrates preparation of a lightly cross-linked PVB using a polyepoxide.

The procedure of Example 6 was repeated except that 2.86 g of a polyepoxide available from Monsanto Company as Santo-Res® 31, was used instead of the dieldehyde of Example 6. Santo-Res® 31 is a polyeproxide formed by condensing the hydrohalide salt of a polyamine with epichlorohydrin as explained in U.S. Pat. No. 4,129,528. The viscosity of the lightly cross-linked PVB obtained was 194 cps (0.194 Pa.s. This procedure was repeated with 5.72g of the polyepoxide and instead of holding the acetalization mixture at 75° C. it was held at 95° C. for 1 h. The viscosity of the resulting lightly cross-linked PVB obtained was 216 cps (0.216 Pa.s which is about 23% greater than that of the uncross-linked control of Example 1. It is also believed that a plasticized PVB sheet could be formed from this cross-linked PVB by following the procedure of Example 5.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. Polyvinyl butyral lightly cross-linked through stable intermolecular linkages wherein the extent of cross-linking is adequate to increase the viscosity of the polyvinyl butyral by about 2% to about 85% over its viscosity in the absence of such linkages said polyvinyl butyral containing 70 to 95 weight % vinyl butyral units.

2. The polyvinyl butyral of claim 1 wherein the stable linkages are diacetal linkages.

3. The polyvinyl butyral of claim 2 wherein the diacetal linkages are developed through an aldehyde containing at least two aldehyde groups.

4. The polyvinyl butyral of claim 3 wherein the diacetal linkages are developed through a trialdehyde or a dialdehyde containing an aliphatic or an aromatic group or a mixture of aliphatic and aromatic groups between carbonyl groups.

5. The polyvinyl butyral of claim 1, 2, 3 or 4 wherein the intermolecular linkages are developed through a dialdehyde selected from the group consisting of glutaraldehyde, 4,4'(ethylenedioxy) dibenzaldehyde and 2-hydroxyhexanedial.

6. The polyvinyl butyral of claim 5 wherein the intermolecular linkages are developed through a trialdehyde.

7. The polyvinyl butyral of claim 5 wherein the diacetal linkages are developed through glutaraldehyde.

* * * * *